United States Patent
Bonifas et al.

(10) Patent No.: US 12,385,537 B2
(45) Date of Patent: Aug. 12, 2025

(54) STATOR CLIP FOR BRAKE ASSEMBLY

(71) Applicant: GOODRICH CORPORATION, Charlotte, NC (US)

(72) Inventors: Alan M. Bonifas, Vandalia, OH (US); Matthew Ryan O'Neil, Tipp City, OH (US); Christopher E. Wright, Arvada, CO (US)

(73) Assignee: GOODRICH CORPORATION, Charlotte, NC (US)

(*) Notice: Subject to any disclaimer, the term of this patent is extended or adjusted under 35 U.S.C. 154(b) by 489 days.

(21) Appl. No.: 17/752,722

(22) Filed: May 24, 2022

(65) Prior Publication Data
US 2023/0400073 A1  Dec. 14, 2023

(51) Int. Cl.
*F16D 65/12* (2006.01)
*F16D 65/02* (2006.01)

(52) U.S. Cl.
CPC ...... *F16D 65/12* (2013.01); *F16D 2065/1304* (2013.01); *F16D 2065/1364* (2013.01); *F16D 2250/0084* (2013.01)

(58) Field of Classification Search
CPC .. F16D 55/36; F16D 65/12; F16D 2250/0084; F16D 2055/0058; F16D 2065/1364; F16D 2065/1392; F16D 2065/1304
USPC .................................................. 188/218 XL
See application file for complete search history.

(56) References Cited

U.S. PATENT DOCUMENTS

| | | | |
|---|---|---|---|
| 3,376,960 A * | 4/1968 | Bender | F16D 65/126 188/218 XL |
| 3,753,476 A | 8/1973 | Dernovashek et al. | |
| 3,757,907 A | 9/1973 | Crossman | |
| 3,907,076 A | 9/1975 | Crossman et al. | |
| 3,927,740 A | 12/1975 | Zarembka | |
| 3,972,395 A * | 8/1976 | Jannasch | F16D 69/023 188/218 XL |
| 6,635,355 B2 | 10/2003 | Bianco et al. | |
| 7,303,055 B2 | 12/2007 | Eckert | |

(Continued)

FOREIGN PATENT DOCUMENTS

| | | | | |
|---|---|---|---|---|
| EP | 3910210 A1 * | 11/2021 | | F16D 65/122 |
| GB | 1246158 | 9/1971 | | |

OTHER PUBLICATIONS

European Patent Office, European Search Report dated Oct. 4, 2023 in Application No. 23175191.8.

(Continued)

*Primary Examiner* — Robert A. Siconolfi
*Assistant Examiner* — San M Aung
(74) *Attorney, Agent, or Firm* — SNELL & WILMER L.L.P.

(57) ABSTRACT

A stator disk assembly for a brake assembly is disclosed. The stator disk assembly includes at least a pair lugs with a recess disposed therebetween, along with a separate stator clip that is separately mounted on each lug of this pair. The stator clip are configured such that a spline of a torque plate that is disposed in the recess will contact only the stator disk and not either of the stator clips in at least certain conditions (e.g., during a braking operation; until crushing of the stator disk). For instance, each of the two ends of each stator clip may be recessed back from the adjacent-most sidewall of the lug on which the stator clip is mounted.

18 Claims, 13 Drawing Sheets

(56) References Cited

U.S. PATENT DOCUMENTS

| | | | |
|---|---|---|---|
| 7,442,443 B2 | 10/2008 | Swank et al. | |
| 7,766,133 B2 | 8/2010 | Cress | |
| 7,802,758 B2 | 9/2010 | Cress et al. | |
| 10,221,905 B2 | 3/2019 | Stevenson | |
| 10,941,823 B2 | 3/2021 | Reed | |
| 11,629,765 B2 | 4/2023 | Jenkinson | |
| 2005/0230196 A1* | 10/2005 | Eckert | F16D 55/36 188/71.1 |
| 2015/0129369 A1* | 5/2015 | Kirkpatrick | F16D 65/126 188/218 XL |
| 2017/0130791 A1* | 5/2017 | Tremblay | F16D 65/12 |
| 2018/0128331 A1 | 5/2018 | Stevenson | |
| 2019/0017562 A1* | 1/2019 | Fiala | F16D 55/36 |
| 2021/0156440 A1 | 5/2021 | Pajak et al. | |
| 2021/0239171 A1* | 8/2021 | Kirkpatrick | C23C 16/045 |
| 2023/0400073 A1 | 12/2023 | Bonifas | |

OTHER PUBLICATIONS

European Patent Office, European Search Report dated Oct. 10, 2023 in Application No. 23174074.7.
USPTO; Non-Final Office Action dated Oct. 7, 2024 in U.S. Appl. No. 17/752,734.
USPTO; Notice of Allowance dated Mar. 3, 2025 in U.S. Appl. No. 17/752,734.
USPTO; Notice of Allowance dated Mar. 19, 2025 in U.S. Appl. No. 17/752,734.

\* cited by examiner

STATOR CLIP FOR BRAKE ASSEMBLY

FIELD

The present disclosure generally relates to brake assemblies (e.g., aircraft brake assemblies) and, more particularly, to stator clips mounted on lugs of a stator disk for a brake assembly.

BACKGROUND

Wrap around or U-channel stator clips are used to increase the structural capability of the stator disk(s) of a brake assembly, such as an aircraft brake assembly. In some cases, the increased strength is beneficial for loadings associated with in-service conditions. However, some disks are fully capable of handling required torque loadings in all cases except under extreme loading conditions that are rarely seen on an aircraft but are required for equipment certification.

The standard design for a stator clip is to extend proud of the carbon disk face such that the stator clip takes all the loading (by directly interfacing with the corresponding spline of the torque plate). Stator clips are commonly formed from sheet metal, resulting in relatively sharp edges that in turn are in contact with the torque plate splines. In some instances, this configuration leads to dynamic instability. Further, the use of stator clips has resulted in reduced braking performance at high aircraft landing energies. This is believed to be a result of stator clip drag on the corresponding torque plate spline.

SUMMARY

A stator disk assembly (e.g., for a brake assembly, for instance an aircraft brake assembly) is presented herein. Both the configuration of such a stator disk assembly and the operational characteristics/operation/assembly/manufacture of such stator disk assembly are within the scope of this Summary.

One aspect is directed to a stator disk assembly that includes a stator disk and a first stator clip, where this stator disk assembly may be used by any appropriate brake assembly including an aircraft brake assembly (e.g., in combination with a rotor disk disposed on each side of the stator disk assembly). The stator disk includes a plurality of lugs that are disposed in spaced relation to one another proceeding about a first reference axis. A first of these lugs includes a lug end wall having a notch, a first sidewall, and a second sidewall, with the first and second sidewalls each extending outwardly from the lug end wall relative to the first reference axis. The first stator clip is disposed within the notch and is mounted to the first lug in any appropriate manner.

The lug end wall of the first lug may include a first end wall portion (or section) and a second end wall portion (or section), with the notch extending between the first and second end wall portions of the first lug. The first stator clip may be configured so as to not protrude beyond the first and second end wall portions in a direction of the first reference axis when positioned within the notch. The first stator clip may be configured such that a clip end wall of the first stator clip is at least substantially flush with the first and second end wall portions of the first lug. The first and second wall portions of the first lug, along with a clip end wall of the first stator clip (disposed within the notch) may be defined by a common radius relative to the first reference axis.

The first lug that may be disposed between a first recess and a second recess (e.g., the first sidewall of the first lug defining a portion of a boundary for the first recess and the second sidewall of the first lug defining a portion of a boundary for the second recess). The first stator clip may be further configured so as to not protrude beyond the first sidewall of the first lug proceeding about the first reference axis in a direction of the first recess (e.g., an adjacent end of the first stator clip may be recessed or spaced back from the first sidewall of the first lug). Similarly, the first stator clip may be configured so as to not protrude beyond the second sidewall of the first lug proceeding about the first reference axis in a direction of the second recess (e.g., an adjacent end of the first stator clip may be recessed or spaced back from the second sidewall of the first lug). Such a configuration accommodates a spline of a torque plate engaging the stator disk (e.g., the first sidewall or the second sidewall of the first lug) during a braking operation without contacting the first stator clip.

Another aspect is directed to a brake assembly that includes a stator disk assembly and a torque plate. The torque plate includes a first spline and a second spline that are spaced from one another proceeding about a first reference axis (e.g., the splines protruding from a barrel of the torque plate). The stator disk assembly includes a stator disk and a first stator clip that is mounted to the stator disk. The stator disk includes a first aperture for receiving at least a portion of the torque plate, and further includes a first recess and a second recess that are spaced from one another proceeding about the first reference axis. A first lug of the stator disk is disposed between the first recess and the second recess, with the first stator clip being mounted on this first lug. In this regard, the first lug includes a lug end wall having a notch that projects at least generally in the direction of the first reference axis. The first stator clip is disposed within this notch and is mounted to the first lug in any appropriate manner. The first spline of the torque plate is disposed within the first recess of the stator disk, while the second spline of the torque plate is disposed within the second recess of the stator disk. Each of the first spline and the second spline are directly engageable with the stator disk within the first recess and the second recess, respectively, without first contacting the first stator clip or any other structure.

Another aspect is directed to a method of reconfiguring a brake assembly that includes a first rotor disk, a second rotor disk, and a first stator disk, with the first stator disk being disposed between the first rotor disk and the second rotor disk. The first stator disk includes a plurality of lugs that are disposed on its inner perimeter and that are spaced about a first reference axis. At least a first of these lugs includes a lug end wall and a first sidewall and a second sidewall that each extend outwardly from the lug end wall relative to the first reference axis. The first stator disk may be removed from the brake assembly.

A second stator disk includes a plurality of lugs that are disposed on its inner perimeter and that are spaced about a second reference axis. At least a second of these lugs includes a lug end wall and a first sidewall and a second sidewall that each extend outwardly from the lug end wall relative to the first reference axis. A stator clip may be mounted in a notch on the lug end wall of the second lug of the second stator disk. The brake assembly may be reassembled with the second stator disk being disposed between the first rotor disk and the second rotor disk (and with the second stator disk incorporating the stator clip disposed in the noted notch).

Another aspect is directed to a method of reconfiguring a brake assembly that includes a first rotor disk, a second rotor disk, and a stator disk, with the stator disk being disposed between the first rotor disk and the second rotor disk. The stator disk includes a plurality of lugs that are disposed on its inner perimeter and that are spaced about a first reference axis. At least a first of these lugs includes a lug end wall and a first sidewall and a second sidewall that each extend outwardly from the lug end wall relative to the first reference axis. The stator disk may be removed from the brake assembly, and thereafter a notch may be formed in the lug end wall of the first lug of the stator disk. A stator clip may be mounted in this notch. The brake assembly may be reassembled with the stator disk being disposed between the first rotor disk and the second rotor disk (and with the stator disk now incorporating the stator clip disposed in the noted notch).

The stator disk for each of the above-noted stator disk assemblies may include any appropriate number of lugs. A stator clip in accordance with the foregoing may be mounted on each of these lugs to provide reinforcement for the corresponding lug. The stator disk for each of the above-noted stator disk assemblies may be formed from any appropriate material or combination of materials, for instance carbon. The stator clip for each of the above-noted stator disk assemblies may be formed from any appropriate material (e.g., steel). Each of the above-noted stator disk assemblies accommodates a spline of a torque plate engaging the stator disk during a braking operation without engaging (at least initially; prior to any crushing of the stator disk) any metal component of the stator disk assembly.

Various aspects of the present disclosure are also addressed by the following examples and in the noted combinations:

1. A stator disk assembly, comprising:
   a stator disk comprising a plurality of lugs disposed on an inner perimeter of said stator disk, spaced about a first reference axis, said plurality of lugs comprising a first lug, wherein said first lug comprises a lug end wall, a first sidewall and a second sidewall, said first and second sidewalls each extending outwardly from said lug end wall relative to said first reference axis, and wherein said lug end wall comprises a notch; and
   a first stator clip disposed within said notch of said first lug and mounted to said first lug.
2. The stator disk assembly of example 1, wherein said lug end wall comprises a first end wall portion and a second end wall portion, wherein said notch extends between said first and second end wall portions, and wherein said first stator clip does not protrude beyond said first and second end wall portions in a direction of said first reference axis.
3. The stator disk assembly of example 1, wherein said lug end wall comprises a first end wall portion and a second end wall portion, wherein said notch extends between said first and second end wall portions, and wherein a clip end wall of said first stator clip is flush with said first and second end wall portions of said first lug.
4. The stator disk assembly of example 3, wherein said first and second end wall portions of said first lug and said clip end wall are defined by a common radius relative to said first reference axis.
5. The stator disk assembly of any of examples 1-4, wherein a recess is disposed between each adjacent pair of lugs of said plurality of lugs, wherein said first lug is disposed between a first recess and a second recess, wherein said first sidewall of said first lug interfaces with said first recess and said second sidewall of said first lug interfaces with said second recess, wherein said first stator clip does not protrude beyond said first sidewall of said first lug proceeding about said first reference axis in a direction of said first recess, wherein said first stator clip does not protrude beyond said second sidewall of said first lug proceeding about said first reference axis in a direction of said second recess, and wherein said first and second sidewalls of said first lug are exposed in an installed configuration.
6. The stator disk assembly of example 5, wherein a first end of said first stator clip is spaced from said first sidewall of said first lug proceeding about said first reference axis in a direction of said second sidewall of said first lug, and wherein an opposite second end of said first stator clip is spaced from said second sidewall of said first lug proceeding about said first reference axis in a direction of said first sidewall of said first lug.
7. The stator disk assembly of example 6, wherein a spacing between said first end and said second end of said first stator clip defines a length dimension of said first stator clip, and wherein said length dimension of said first stator clip corresponds with a length dimension of said first lug proceeding from said first sidewall to said second sidewall.
8. The stator disk assembly of any of examples 6-7, wherein said first end of said first stator clip is spaced from said first sidewall of said first lug by a distance of at least about 0.020 inches proceeding about said first reference axis in a direction of said second sidewall of said first lug, and wherein said second end of said first stator clip is spaced from said second sidewall of said first lug by a distance of at least about 0.020 inches proceeding about said first reference axis in a direction of said first sidewall of said first lug.
9. The stator disk assembly of any of examples 6-8, wherein said first end of said first stator clip is spaced from said first sidewall of said first lug by a distance of no more than about 0.040 inches proceeding about said first reference axis in a direction of said second sidewall of said first lug, and wherein said second end of said first stator clip is spaced from said second sidewall of said first lug by a distance of no more than about 0.040 inches proceeding about said first reference axis in a direction of said first sidewall of said first lug.
10. The stator disk assembly of any of examples 6-9, wherein said first end of said first stator clip is spaced from said first sidewall of said first lug within a range of about 0.020 inches to about 0.040 inches proceeding about said first reference axis in a direction of said second sidewall of said first lug, and wherein said second end of said first stator clip is spaced from said second sidewall of said first lug within a range of about 0.020 inches to about 0.040 inches proceeding about said first reference axis in a direction of said first sidewall of said first lug.
11. The stator disk assembly of any of examples 6-10, wherein a length of said first stator clip is measured about said first reference axis and is less than a length of said first lug also measured about said first reference axis.
12. The stator disk assembly of any of examples 5-11, wherein said first stator clip is U-shaped, is a monolithic structure, and comprises a clip end wall that is disposed over a lug end wall of said first lug that extends between said first and second sidewalls of said first lug.

13. The stator disk assembly of any of examples 5-12, wherein said first stator clip is metallic and said stator disk comprises carbon.
14. The stator disk assembly of any of examples 5-13, wherein said stator disk further comprises an outer perimeter, wherein each of said inner perimeter and said outer perimeter are annular and are disposed about said first reference axis, wherein said inner perimeter defines an outer boundary of a first aperture through said stator disk.
15. The stator disk assembly of example 14, wherein each said recess of said stator disk is on said inner perimeter and extends toward but not to said outer perimeter.
16. The stator disk assembly of any of examples 14-15, wherein each said recess is equally spaced proceeding about said first reference axis.
17. The stator disk assembly of any of examples 14-16, wherein said plurality of lugs are equally spaced proceeding about said first reference axis.
18. The stator disk assembly of any of examples 5-17, wherein each lug of said plurality of lugs comprises a first sidewall and second sidewall, the stator disk assembly further comprising:
    a first spline interface for said first recess, wherein said first spline interface consists essentially of said first sidewall of said first lug and said second sidewall of a first adjacent lug of said plurality of lugs, wherein a first base extends between said first lug and said first adjacent lug; and
    a second spline interface for said second recess, wherein said second spline interface consists essentially of said second sidewall of said first lug and said first sidewall of a second adjacent lug of said plurality of lugs, wherein a second base extends between said first lug and said second adjacent lug, wherein said stator disk comprises said first base and said second base.
19. The stator disk assembly of any of examples 5-18, further comprising:
    a first crush zone extending from said first sidewall of said first lug to said first stator clip, proceeding about said first reference axis in a direction of said second sidewall of said first lug, and consisting essentially of said stator disk; and
    a second crush zone extending from said second sidewall to said first stator clip, proceeding about said first reference axis in a direction of said first sidewall of said first lug, and consisting essentially of said stator disk.
20. The stator disk assembly of any of examples 5-19, wherein said stator disk assembly consists essentially of said stator disk and a plurality of stator clips that are each in accordance with said first stator clip.
21. The stator disk assembly of any of examples 5-20, wherein said first stator clip contacts said stator disk and no other portion of said stator disk assembly.
22. A brake assembly comprising:
    a torque plate comprising a first spline and a second spline; and
    the stator disk assembly of any of examples 5-21, wherein said first spline is disposed within said first recess and said second spline is disposed within said second recess.
23. The brake assembly of example 22, wherein each of said first spline and said second spline only contact said stator disk.
24. The brake assembly of any of examples 22-23, wherein each of said first spline and said second spline do not contact said first stator clip.
25. The brake assembly of any of examples 22-24, further comprising a first rotor disk and a second rotor disk that are each rotatable relative to said stator disk, wherein said stator disk is disposed between said first rotor disk and said second rotor disk, wherein said stator disk is maintained in a fixed position relative to said first rotor disk and said second rotor disk by said torque plate, and wherein said first rotor disk is engageable with a first side of said stator disk and said second rotor disk is engageable with an opposite second side of said stator disk during a braking operation where said first rotor disk and said second rotor disk are rotating.
26. A brake assembly comprising:
    a torque plate comprising an outer surface disposed about a first reference axis, said outer surface comprising a first spline and a second spline that are spaced from one another proceeding about said first reference axis; and
    a stator disk assembly mounted on said torque plate, comprising:
        a stator disk comprising an inner perimeter disposed about a first aperture, wherein said inner perimeter comprises a first recess and a second recess that are spaced from one another proceeding about said first reference axis and a first lug disposed between said first recess and said second recess, wherein said first lug comprises a lug end wall that in turn comprises a notch that projects in a direction of said first reference axis; and
        a first stator clip disposed within said notch of said first lug and mounted to said first lug;
    wherein said first spline is disposed within said first recess and said second spline is disposed within said second recess, and wherein each of said first spline and said second spline are directly engageable with said stator disk within said first recess and said second recess, respectively, without first contacting said first stator clip.
27. The brake assembly of example 26, wherein said lug end wall comprises a first end wall portion and a second end wall portion, wherein said notch extends between said first and second end wall portions, and wherein said first stator clip does not protrude beyond said first and second end wall portions in a direction of said first reference axis.
28. The brake assembly of example 26, wherein said lug end wall comprises a first end wall portion and a second end wall portion, wherein said notch extends between said first and second end wall portions, and wherein a clip end wall of said first stator clip is flush with said first and second end wall portions of said first lug.
29. The brake assembly of example 28, wherein said first and second end wall portions of said first lug and said clip end wall are defined by a common radius relative to said first reference axis.
30. The brake assembly of example 26, wherein said first lug comprises a first sidewall and second sidewall that are spaced from one another proceeding about said first reference axis, wherein said first sidewall of said first lug adjoins said first recess, wherein said second sidewall of said first lug adjoins said second recess, wherein said first stator clip does not protrude beyond said first sidewall of said first lug proceeding about said first reference axis in a direction of said first recess, wherein said first stator clip does not protrude beyond said second sidewall of said first lug proceeding about said first reference axis in a direction of said second recess, and wherein said first and second sidewalls of said first lug are exposed in an installed configuration.
31. The brake assembly of any of example 30, wherein a first end of said first stator clip is spaced from said first sidewall of said first lug proceeding about said first reference axis in a direction of said second sidewall of said first lug, and wherein an opposite second end of said first stator clip is spaced from said second sidewall of said first lug proceeding about said first reference axis in a direction of said first sidewall of said first lug.
32. The brake assembly of example 31, wherein a spacing between said first end and said second end of said first stator clip defines a length dimension of said first stator clip, and wherein said length dimension of said first stator clip corresponds with a length dimension of said first lug proceeding from said first sidewall to said second sidewall.
33. The brake assembly of any of examples 31-32, wherein said first end of said first stator clip is spaced from said first sidewall of said first lug by a distance of at least about 0.020 inches proceeding about said first reference axis in a direction of said second sidewall of said first lug, and wherein said second end of said first stator clip is spaced from said second sidewall of said first lug by a distance of at least about 0.020 inches proceeding about said first reference axis in a direction of said first sidewall of said first lug.
34. The brake assembly of any of examples 31-33, wherein said first end of said first stator clip is spaced from said first sidewall of said first lug by a distance of no more than about 0.040 inches proceeding about said first reference axis in a direction of said second sidewall of said first lug, and wherein said second end of said first stator clip is spaced from said second sidewall of said first lug by a distance of no more than about 0.040 inches proceeding about said first reference axis in a direction of said first sidewall of said first lug.
35. The brake assembly of any of examples 31-34, wherein said first end of said first stator clip is spaced from said first sidewall of said first lug within a range of about 0.020 inches to about 0.040 inches proceeding about said first reference axis in a direction of said second sidewall of said first lug, and wherein said second end of said first stator clip is spaced from said second sidewall of said first lug within a range of about 0.020 inches to about 0.040 inches proceeding about said first reference axis in a direction of said first sidewall of said first lug.
36. The brake assembly of any of examples 26-35, wherein a length of said first stator clip is measured about said first reference axis and is less than a length of said first lug also measured about said first reference axis.
37. The brake assembly of any of examples 26-36, wherein said first stator clip is U-shaped, is a monolithic structure, and comprises a clip end wall that is disposed over a lug end wall of said first lug that extends between said first and second sidewalls of said first lug.
38. The brake assembly of any of examples 26-37, wherein said first stator clip is metallic, said stator disk comprises carbon, and said first and second splines are each metallic.
39. The brake assembly of any of examples 26-38, wherein said stator disk further comprises an outer perimeter that is disposed outwardly of said inner perimeter relative to said first reference axis, and wherein said inner perimeter and said outer perimeter are each annular and disposed about said first reference axis.
40. The brake assembly of example 39, wherein said first recess and said second recess are each on said inner perimeter and extend toward but not to said outer perimeter.
41. The brake assembly of any of examples 26-40, further comprising:
a plurality of lugs disposed on said inner perimeter of said stator disk and comprising said first lug, wherein each lug of said plurality of lugs comprises a first sidewall and second sidewall, and wherein a recess is disposed between each adjacent pair of lugs of said plurality of lugs proceeding about said first reference axis;
a first spline interface for said first recess, wherein said first spline interface consists essentially of said first sidewall of said first lug and said second sidewall of a first adjacent lug of said plurality of lugs, wherein a first base extends between said first lug and said first adjacent lug; and
a second spline interface for said second recess, wherein said second spline interface consists essentially of said second sidewall of said first lug and said first sidewall of a second adjacent lug of said plurality of lugs, wherein a second base extends between said first lug and said second adjacent lug, wherein said stator disk comprises said first base and said second base.
42. The brake assembly of any of examples 26-41, further comprising:
a plurality of lugs disposed on said inner perimeter of said stator disk and comprising said first lug, wherein each lug of said plurality of lugs comprises a first sidewall and second sidewall, and wherein a recess is disposed between each adjacent pair of lugs of said plurality of lugs proceeding about said first reference axis;
a first crush zone extending from said first sidewall of said first lug to said first stator clip, proceeding about said first reference axis in a direction of said second sidewall of said first lug, and consisting essentially of said stator disk; and
a second crush zone extending from said second sidewall to said first stator clip, proceeding about said first reference axis in a direction of said first sidewall of said first lug, and consisting essentially of said stator disk.
43. The brake assembly of any of examples 26-42, wherein said stator disk assembly consists essentially of said stator disk and a plurality of stator clips that are each in accordance with said first stator clip.
44. The brake assembly of any of examples 26-43, wherein said first stator clip contacts said stator disk and no other portion of said stator disk assembly.
45. The brake assembly of any of examples 26-44, wherein said stator disk assembly further comprises a first rotor disk and a second rotor disk that are each rotatable relative to said stator disk, wherein said stator disk is disposed between said first rotor disk and said second rotor disk, wherein said stator disk is maintained in a fixed position relative to said first rotor disk and said second rotor disk by said torque plate, and wherein said first rotor disk is engageable with a first side of said stator disk and said second rotor disk is engageable with an opposite second side of said stator disk during a braking operation where said first rotor disk and said second rotor disk are rotating.

46. A method of reconfiguring a brake assembly comprising a first rotor disk, a second rotor disk, and a first stator disk, wherein said first stator disk is disposed between said first rotor disk and said second rotor disk and comprises a plurality of lugs disposed on an inner perimeter of said first stator disk, spaced about a first reference axis, and comprising a first lug, wherein said first lug comprises a lug end wall and a first sidewall and a second sidewall that each extend outwardly from said lug end wall of said first lug relative to said first reference axis, said method comprising:
    removing said first stator disk from said brake assembly, wherein a second stator disk comprises a plurality of lugs disposed on an inner perimeter of said second stator disk, spaced about a second reference axis, and comprising a second lug, wherein said second lug comprises a lug end wall and a first sidewall and a second sidewall that each extend outwardly from said lug end wall of said second lug relative to said first reference axis;
    mounting a stator clip in a notch on said lug end wall of said second lug of said second stator disk; and
    reassembling said brake assembly after said mounting, with said second stator disk being disposed between said first rotor disk and said second rotor disk.

47. The method of example 46, wherein said inner perimeter of each of said first stator disk and said second stator disk are of a common diameter.

48. A method of reconfiguring a brake assembly comprising a first rotor disk, a second rotor disk, and a stator disk, wherein said stator disk is disposed between said first rotor disk and said second rotor disk and comprises a plurality of lugs disposed on an inner perimeter of said stator disk, spaced about a first reference axis, and comprising a first lug, wherein said first lug comprises a lug end wall and a first sidewall and a second sidewall that each extend outwardly from said lug end wall relative to said first reference axis, said method comprising:
    removing said stator disk from said brake assembly;
    forming a notch in said lug end wall of said first lug of said stator disk;
    mounting a stator clip in said notch of said lug end wall of said first lug of said stator disk after said removing; and
    reassembling said brake assembly after said mounting, with said stator disk being disposed between said first rotor disk and said second rotor disk.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
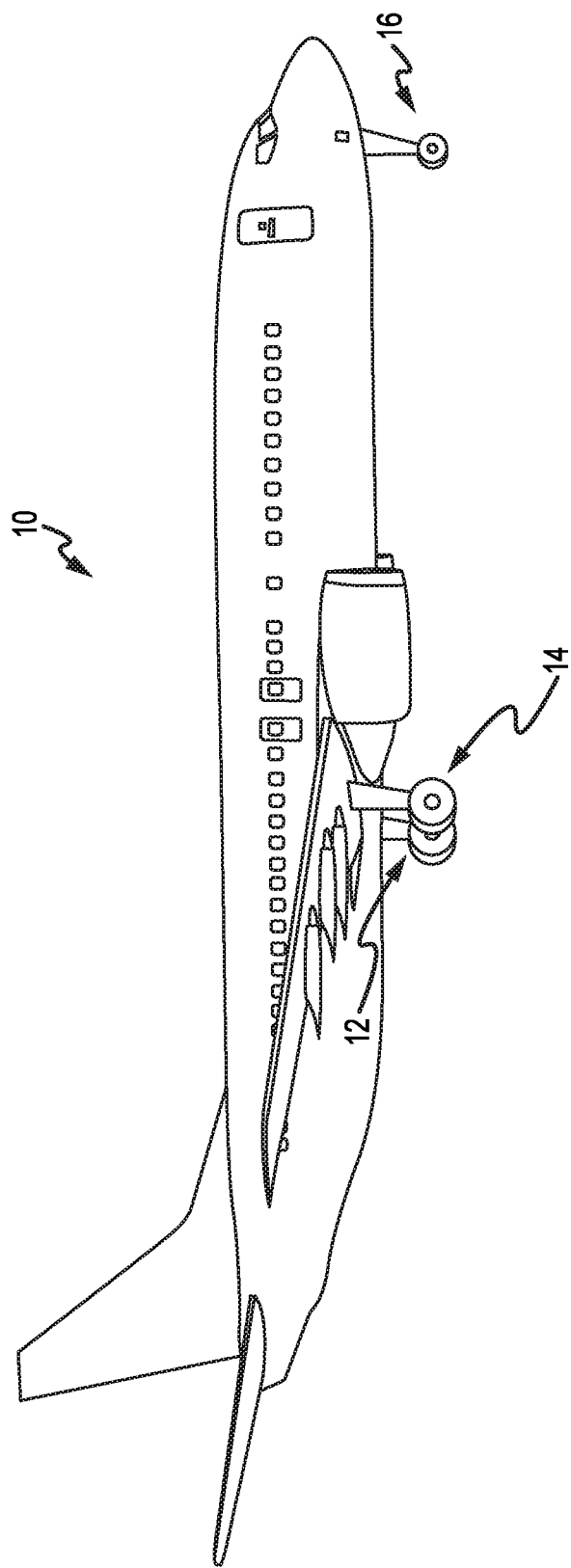
FIG. 1A illustrates an exemplary aircraft having a brake assembly in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
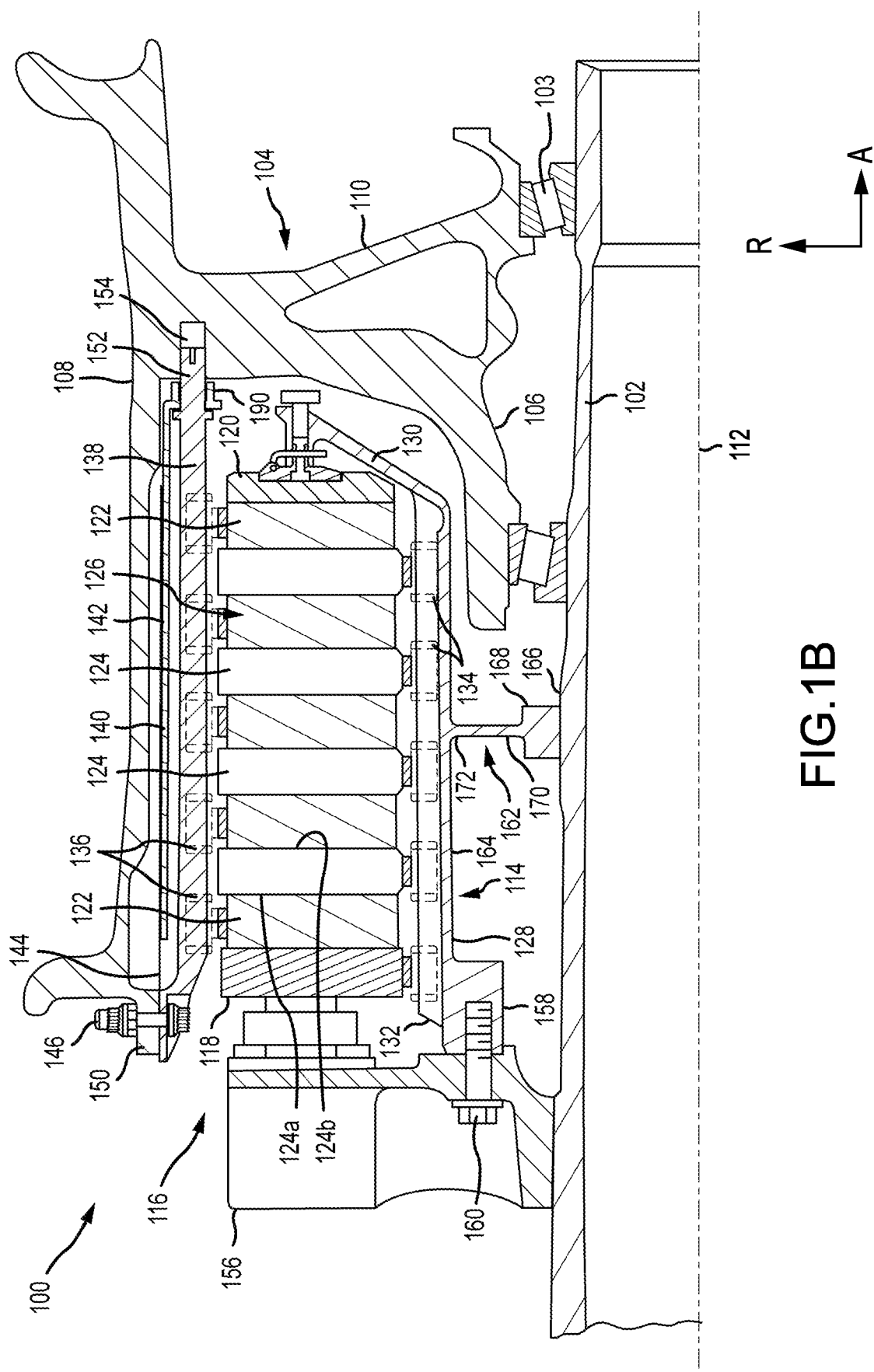
FIG. 1B illustrates a cross-sectional view of a brake assembly in accordance with various embodiments.

Referring now to FIG. 1B, there is schematically depicted a brake assembly or a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102. Each stator disk 124 includes a pair of oppositely disposed sides 124a, 124b that each interface with a corresponding rotor disk 122 during a braking operation.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2A:
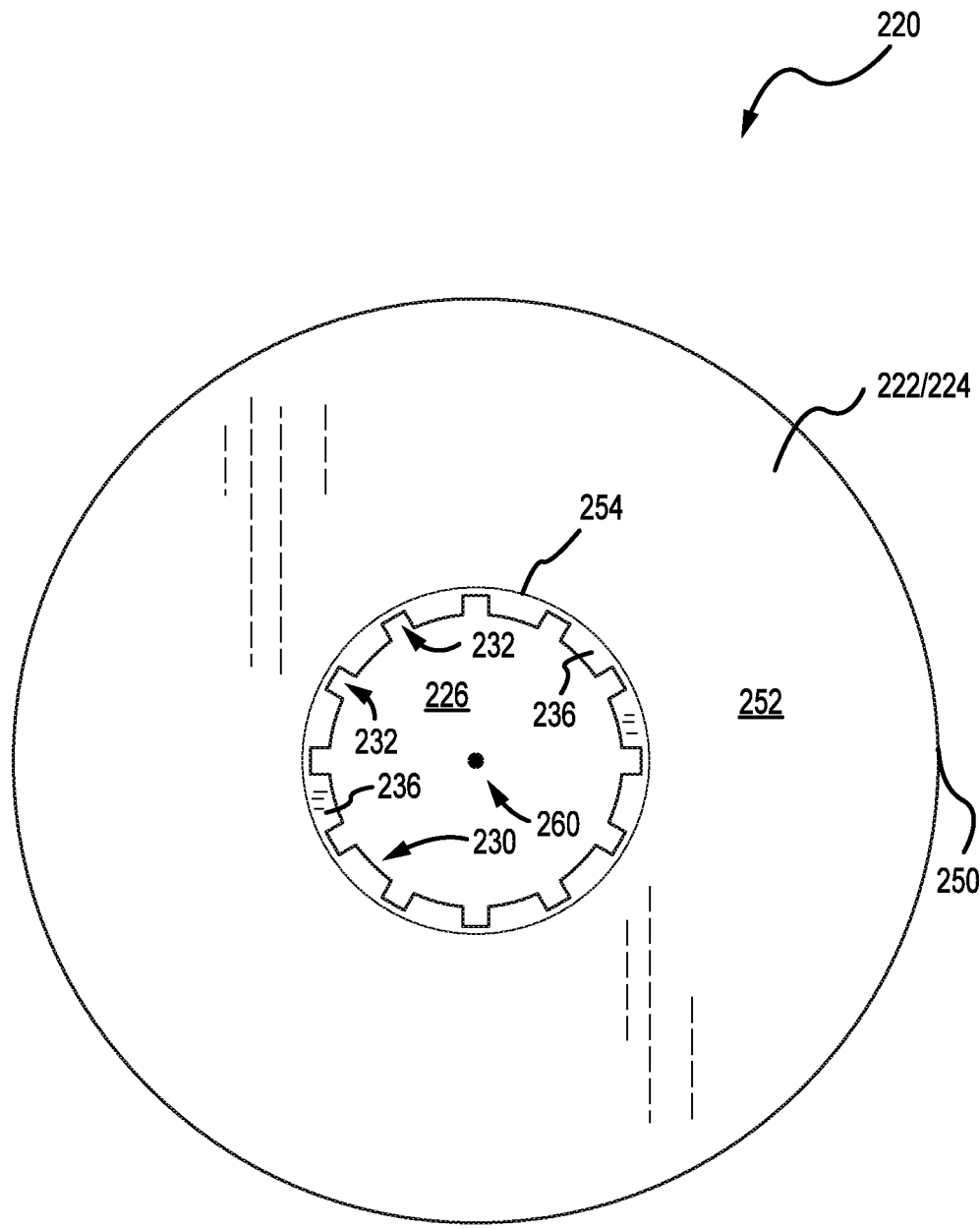
FIG. 2A is a plan view of a stator disk for a brake assembly in accordance with various embodiments.

FIG. 2A illustrates a stator disk 220 that may be used as the stator disks 124 addressed above with regard to the brake assembly 100 of FIG. 1B. Although the stator disk 220 may be formed from any appropriate material or combination of materials, the stator disk 220 may be formed from carbon in various embodiments. An inner perimeter 230 of the stator disk 220 (or more generally for an inner perimeter 230 of a stator disk assembly that utilizes the stator disk 220) is illustrated in FIG. 2A, is annularly disposed about a first reference axis 260 (e.g., extends a full 360° about the axis 260), and defines an outer boundary of a first aperture or a first mounting aperture 226 (e.g., for receipt of a torque plate). A plurality of lugs 236 are incorporated by the inner perimeter 230, and these lugs 236 may be characterized as being disposed in radially-spaced or circumferentially-spaced relation to one another about/relative to the first reference axis 260. A recess 232 is disposed between each adjacent pair of lugs 236. As such, the stator disk 220 also includes a plurality of recesses 232 and these recesses 232 may be characterized as being disposed in radially-spaced or circumferentially-spaced relation to one another about/relative the first reference axis 260. These lugs 236 and recesses 232 will be addressed in more detail below in relation to FIG. 2B and FIGS. 3A-3C. The stator disk 220 may include any appropriate number of lugs 236 and recesses 232.

An outer perimeter 250 of the stator disk 220 is disposed outwardly of the inner perimeter 230, relative to the first reference axis 260. The stator disk 220 includes a first side 222 (e.g., corresponding with the first side 124a of one of the stator disks 124 shown in FIG. 1B), where this first side 222 may interface with a rotor disk during a braking operation. The stator disk 220 includes an oppositely disposed second side 224 (e.g., corresponding with the second side 124b of one of the stator disks 124 shown in FIG. 1B), where this second side 224 may interface with a different rotor disk during a braking operation. The thickness of the stator disk 220 corresponds with the spacing between these two sides 222, 224. Each of the first side 222 and second side 224 of the stator disk 220 include what may be characterized as a braking surface 252 that extends from an inner braking surface boundary 254 to the outer perimeter 250 of the stator disk 220. Each braking surface 252 would engage a different corresponding rotor disk (e.g., rotor disk 122—FIG. 1B) during a braking operation.

Figure 2B:
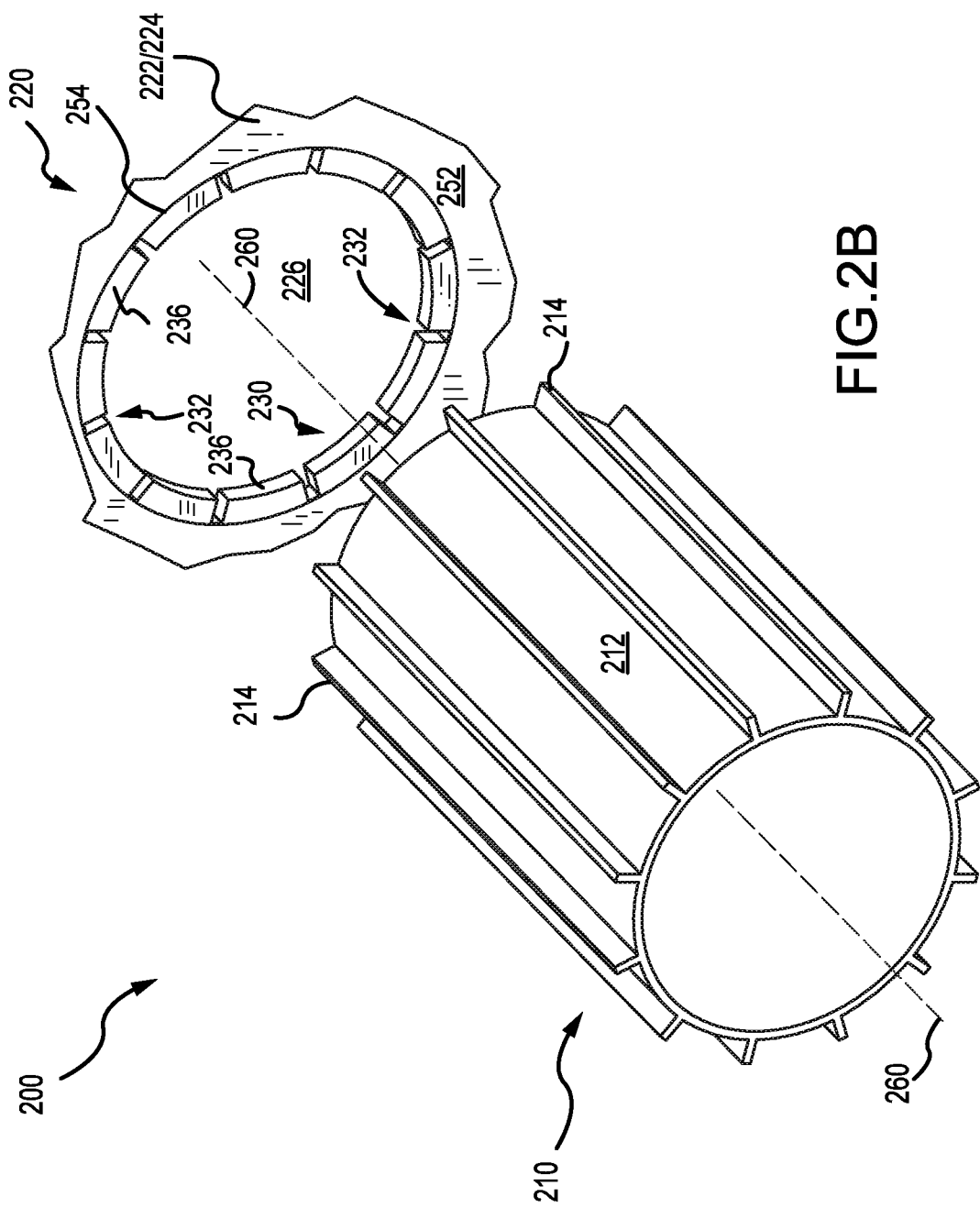
FIG. 2B is an exploded, perspective illustrating a torque plate and a stator disk for a brake assembly, in accordance with various embodiments.

FIG. 2B illustrates a portion of a brake assembly 200 (e.g., brake assembly 100 of FIG. 1B) that includes the above-described stator disk 220. Only an inward portion of the stator disk 220 (relative to the first reference axis 260) is illustrated in FIG. 2B. The brake assembly 200 further includes a torque plate 210. The torque plate 210 includes an outer surface 212 (e.g., a barrel) that is disposed about the first reference axis 260. This outer surface 212 may be cylindrical. A plurality of splines, ribs, or protrusions 214 are disposed on the outer surface 212 of the torque plate 210. The splines 214 may be disposed parallel with the first reference axis 260 and may be disposed about this same first reference axis 260 (e.g., the splines 214 may be characterized as being disposed in radially-spaced or circumferentially-spaced relation to one another about/relative the first reference axis 260). Each spline 214 of the torque plate 210 is disposed in a corresponding recess 232 of the stator disk 220. As such, typically the brake assembly will include an equal number of splines 214 (torque plate 210) and recesses 232 (stator disk 220).

Figure 3A:
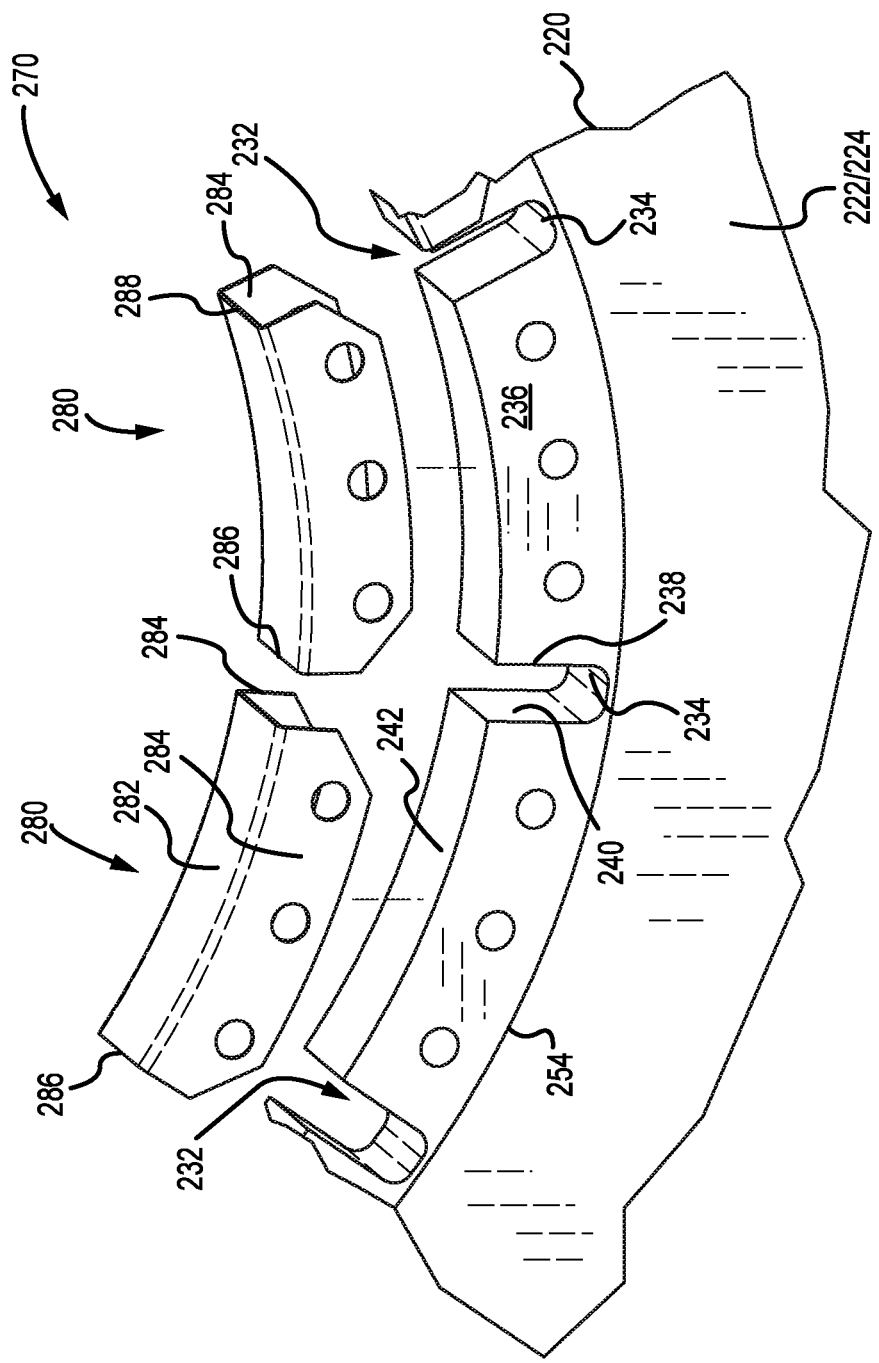
FIG. 3A is a perspective view of a portion of a stator disk assembly that uses the stator disk of FIG. 2A, where a pair of stator clips are exploded from a corresponding pair of lugs of the stator disk in accordance with various embodiments.
Figure 3B:
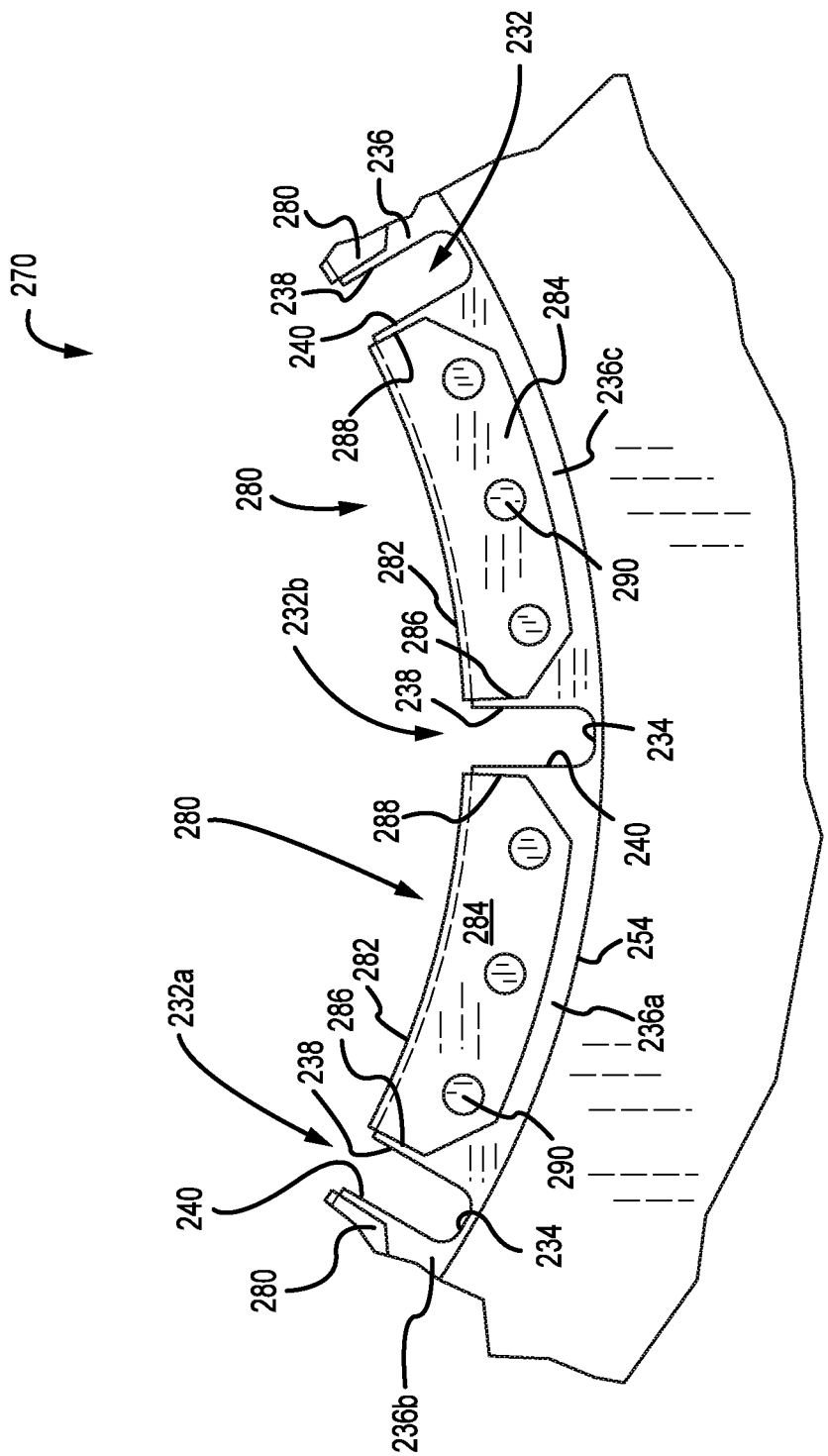
FIG. 3B is a plan view of the pair of stator clips from the stator disk assembly of FIG. 3A, where each stator clip is mounted on a different lug of the stator disk in accordance with various embodiments.
Figure 3C:
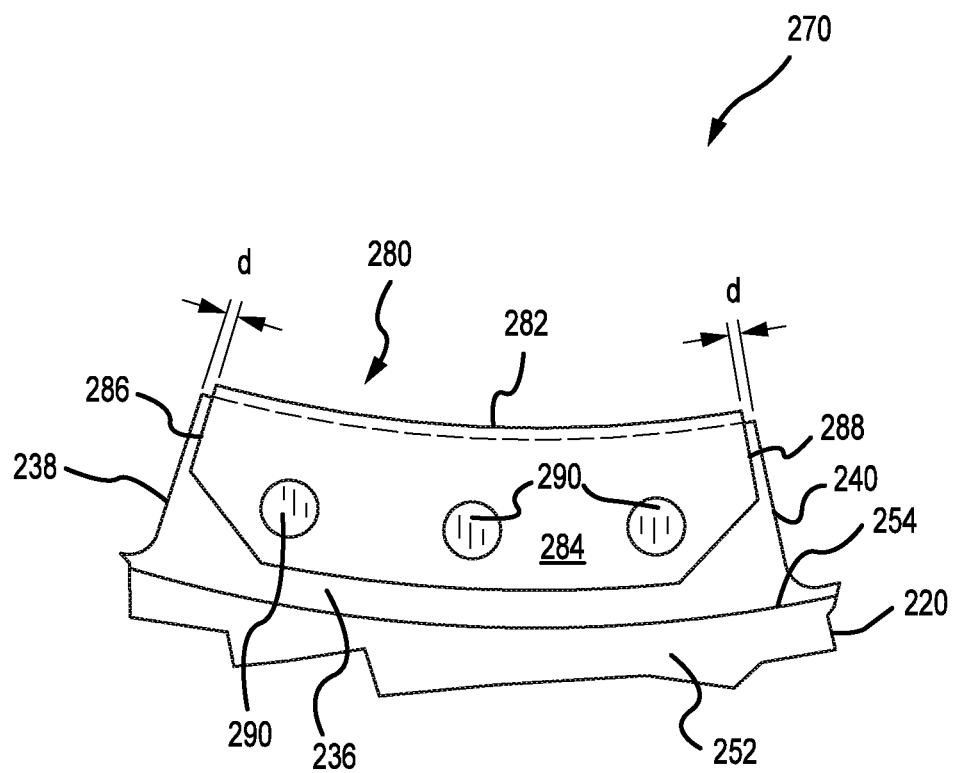
FIG. 3C is an enlarged view of one of the stator clips and the corresponding lug from the stator disk assembly of FIG. 3B in accordance with various embodiments.

What may be characterized as a stator disk assembly is illustrated in FIGS. 3A-3C and is identified by reference numeral 270. The stator disk assembly 270 may be used by the brake assembly 200 of FIG. 2B and includes the above-noted stator disk 220 (FIG. 2A) and a plurality of stator clips 280. A separate stator clip 280 may be mounted on each lug 236 of the stator disk 220. The stator clip 280 includes a clip end wall 282 and a pair of clip sidewalls 284, providing the stator clip 280 with a generally U-shaped body when viewed from an end of the stator clip 280. The stator clip 280 may be an integral or monolithic structure, and may be formed from any appropriate material (e.g., steel, or more generally metallic—formed from one or more metals, one or more metal alloys, or a combination thereof).

As noted, a recess 232 is disposed between each adjacent pair of lugs 236 of the stator disk 220. Each recess 232 may be characterized as including a base 234 (the base 234 being a surface of the stator disk 220) that extends between its corresponding pair of lugs 236. Each lug 236 includes a first sidewall 238, a second sidewall 240, and a lug end wall 242 (each of which is a surface of the stator disk 220). Each stator clip 280 may be characterized as using a "saddle-type mounting" to the corresponding lug 236 of the stator disk 220. In this regard, the clip end wall 282 of a stator clip 280 may be disposed over part of the lug end wall 242 of the corresponding lug 236, one of the clip sidewalls 284 of the stator clip 280 may be disposed against/in proximity to the corresponding lug 236 on the first side 222 of the stator disk 220, and the other of the clip sidewalls 284 of the stator clip 280 may be disposed against/in proximity to the corresponding lug 236 on the second side 224 of the stator disk 220. Each stator clip 280 may be secured to the stator disk 220 in any appropriate manner, such as by one or more rivets 290 as shown in FIGS. 3B and 3C (e.g., each rivet 290 may extend through one of the clip sidewalls 284 of the stator clip 280, through the corresponding lug 236, and through the other of the clip sidewalls 284 of the stator clip 280).

FIG. 3B illustrates a portion of the stator disk assembly 270. A first recess 232a is disposed between a first lug 236a and a first adjacent lug 236b, with the first recess 232a being defined by the first sidewall 238 of the first lug 236a, the second sidewall 240 of the first adjacent lug 236b, and the base 234 that extends between the first lug 236a and the first adjacent lug 236b. A second recess 232b is disposed between the first lug 236a and a second adjacent lug 236c, with the second recess 232b being defined by the second sidewall 240 of the first lug 236a, the first sidewall 238 of the second adjacent lug 236c, and the base 234 that extends between the first lug 236a and the second adjacent lug 236c.

Each stator clip 280 includes a first end or first clip end 286, and an oppositely disposed second end or second clip end 288. A maximum length of the stator clip 280 corresponds with the spacing between its corresponding first end 286 and its second end 288, as measured proceeding about the first reference axis 260 (e.g., along an arcuate path). A length of the lugs 236 corresponds with the spacing between its corresponding first sidewall 238 and its corresponding second sidewall 240, is also measured proceeding about the first reference axis 260 (e.g., along an arcuate path). The length of a given stator clip 280 is shorter than the length of the lug 236 on which the stator clip 280 is mounted.

The stator clip 280 may be characterized as being disposed entirely on its corresponding lug 236. A portion of the lug end wall 242 may be exposed between the first end 286 of the stator clip 280 and the intersection of the lug end wall 242 with the first sidewall 238 of the lug 236. Similarly, a portion of the lug end wall 242 may be exposed between the second end 288 of the stator clip 280 and the intersection of the lug end wall 242 with the second sidewall 240 of the lug 236. The ends 286, 288 of the stator clip 280 are those portions of the stator clip 280 that are closest to the intersection of the lug end wall 242 with the first sidewall 238 of the lug 236 and to the intersection of the lug end wall 242 with the second sidewall 240 of the lug 236, respectively. The clip end wall 282 and part of each of the clip sidewalls 284 incorporate the ends 286, 288 in the case of the stator disk assembly 270 of FIGS. 3A-3C.

Referring primarily to FIG. 3C, the stator clip 280 is positioned on its corresponding lug 236 such that this stator clip 280 does not protrude beyond the first sidewall 238 of the lug 236, and furthermore does not protrude beyond the second sidewall 240 of the lug 236. In FIG. 3C, the stator clip 280 is more specifically positioned on the lug 236 such that: 1) the first end 286 of this stator clip 280 is spaced from the first sidewall 238 of the lug 236 proceeding about the first reference axis 260 in a direction of the second sidewall 240 of this lug 236 (represented by distance d); and 2) the second end 288 of this stator clip 280 is spaced from the second sidewall 240 of the lug 236 proceeding about the first reference axis 260 in a direction of the first sidewall 238 of this lug 236 (also represented by distance d). Applicable values for the distance d include without limitation: 1) a distance of at least about 0.020 inches (although other minimum spacings may be appropriate; 2) a distance of no more than about 0.040 inches (although other maximum spacings may be appropriate); and/or 3) a distance within a range of about 0.020 inches to about 0.040 inches. The foregoing is applicable to each lug 236 and its corresponding stator clip 280.

There are a number of features that relate to the above-noted positioning of the stator clips 280 relative to their corresponding lug 236. The first sidewall 238 and second sidewall 240 of each lug 236 are exposed surfaces when the brake assembly 200 (FIGS. 2A and 2B) is in an installed configuration. A corresponding spline 214 of the torque plate 210 that is disposed in a corresponding recess 232 of the stator disk 220 should engage either the first sidewall 238 of the second sidewall 240 of the corresponding recess 232 without engaging a stator clip 280 or any other structure (e.g., there may be a direct line-of-site from a spline 214 to the sidewall 238, 240 of the corresponding adjacent pair of lugs 236), including during a braking operation. Stated another way, contact between the splines 214 of the torque plate 210 and the stator disk assembly 270 should be limited to contact between the splines 214 and the stator disk 220 for at least certain conditions. Limiting contact to between the splines 214 (typically metal) and the stator disk 220 (e.g., carbon), versus with one or more stator clips 280 (e.g., metal), provides a number of benefits (e.g., improved dynamic stability; reduced dynamic instability; acceptable braking performance at high aircraft landing energies (for instance due to reduced clip drag on the torque plate 210, more specifically its splines 214)). What may be characterized as a "spline interface" for a given recess 232 of the stator disk 220 may be entirely defined by a first sidewall 238 of one lug 236 and a second sidewall 240 of an adjacent lug 236 (each of which is a surface of the stator disk 220).

Under extreme loading conditions (e.g., conditions to be demonstrated as part of equipment certification, but unlikely to be realized in service), one or more lugs 236 of the stator disk 220 may start to crush by the noted interaction between a given lug 236 and a corresponding spline 214 of the torque plate 210. The above-noted spacing d may be characterized as providing a "crush zone"—an amount of the stator disk 220 that can be "crushed" before there is contact between a given spline 214 and a corresponding stator clip 280 (e.g., before there is metal-to-metal contact, which may adversely impact the efficiency of braking performance or increase dynamic instability, which may result in brake-induced vibration).

A variation of the stator disk assembly 270 of FIGS. 3A-3B is presented in FIGS. 4A-4D and is identified by reference numeral 270'. Corresponding components between the stator disk assembly 270 (FIGS. 3A-3C) and the stator disk assembly 270' (FIGS. 4A-4D) are identified by the same reference numerals. Those corresponding components that differ in at least some respect are identified by a "single prime" designation for the stator disk assembly 270'. Unless otherwise noted herein to the contrary, the foregoing discussion of components of the stator disk assembly 270 remains equally applicable to the corresponding component of the stator disk assembly 270' (including those components of the stator disk assembly 270' that differ in at least some respect from the corresponding component of the stator disk assembly 270).

A recess 232 is disposed between each adjacent pair of lugs 236' in the case of the stator disk assembly 270', similar to the stator disk assembly 270. In this regard and referring initially to FIG. 4C (illustrating a portion of the stator disk assembly 270'), a first recess 232a is disposed between a first lug 236a' and a first adjacent lug 236b', with the first recess 232a being defined by the first sidewall 238 of the first lug 236a', the second sidewall 240 of the first adjacent lug 236b', and the base 234 that extends between the first lug 236a' and the first adjacent lug 236b'. A second recess 232b is disposed between the first lug 236a' and a second adjacent lug 236c', with the second recess 232b being defined by the second sidewall 240 of the first lug 236a', the first sidewall 238 of the second adjacent lug 236c', and the base 234 that extends between the first lug 236a' and the second adjacent lug 236c'.

The stator disk 220' of the stator disk assembly 270' differs from the above-discussed stator disk 220 of the stator disk assembly 270 primarily in relation to the lug end wall 242' of each lug 236'. As such, the inner perimeter 230' of the stator disk assembly 270'/stator disk 220' also differs from the inner perimeter 230 of the stator disk assembly 270/stator disk 220.

The lug end wall 242' of each lug 236' includes a notch 244. This notch 244 is spaced from the intersection of the lug end wall 242' and each of the sidewalls 238, 240 of the corresponding lug 236'. As such, there is a first end wall portion or section 248a between one end of the notch 244 and the intersection of the lug end wall 242' with the first sidewall 238. Similarly, there is a second end wall portion or section 248b between the opposite end of the notch 244 and the intersection of the lug end wall 242' with the second sidewall 240. A base 246 of the notch 244 is thereby offset (further radially outward from the first reference axis 260) from each of the end wall portions 248a, 248b.

The stator clip 280' of the stator disk assembly 270' also differs from the stator clip 280 of the stator disk assembly 270 (FIGS. 3A-3C). The stator clip 280' of the stator disk assembly 270' of FIGS. 4A-4D again includes a clip end wall 282' and a pair of clip sidewalls 284', is at least generally U-shaped, may be an integral or monolithic structure, and may be formed from any appropriate material (e.g., steel, or more generally metallic—formed from one or more metals, one or more metal alloys, or a combination thereof). The stator clip 280' also includes a first end or first clip end 286', and an oppositely disposed second end or second clip end 288'. A maximum length of the stator clip 280' corresponds with the spacing between its corresponding first end 286' and its second end 288', as measured proceeding about the first reference axis 260 (e.g., along an arcuate path). In contrast to the stator clip 280 for the stator disk assembly 270 of FIGS. 3A-3C, the ends 286', 288' of the stator clip 280' of the stator disk assembly 270' of FIGS. 4A-4D are incorporated entirely by the clip sidewalls 284'.

Figure 4A:
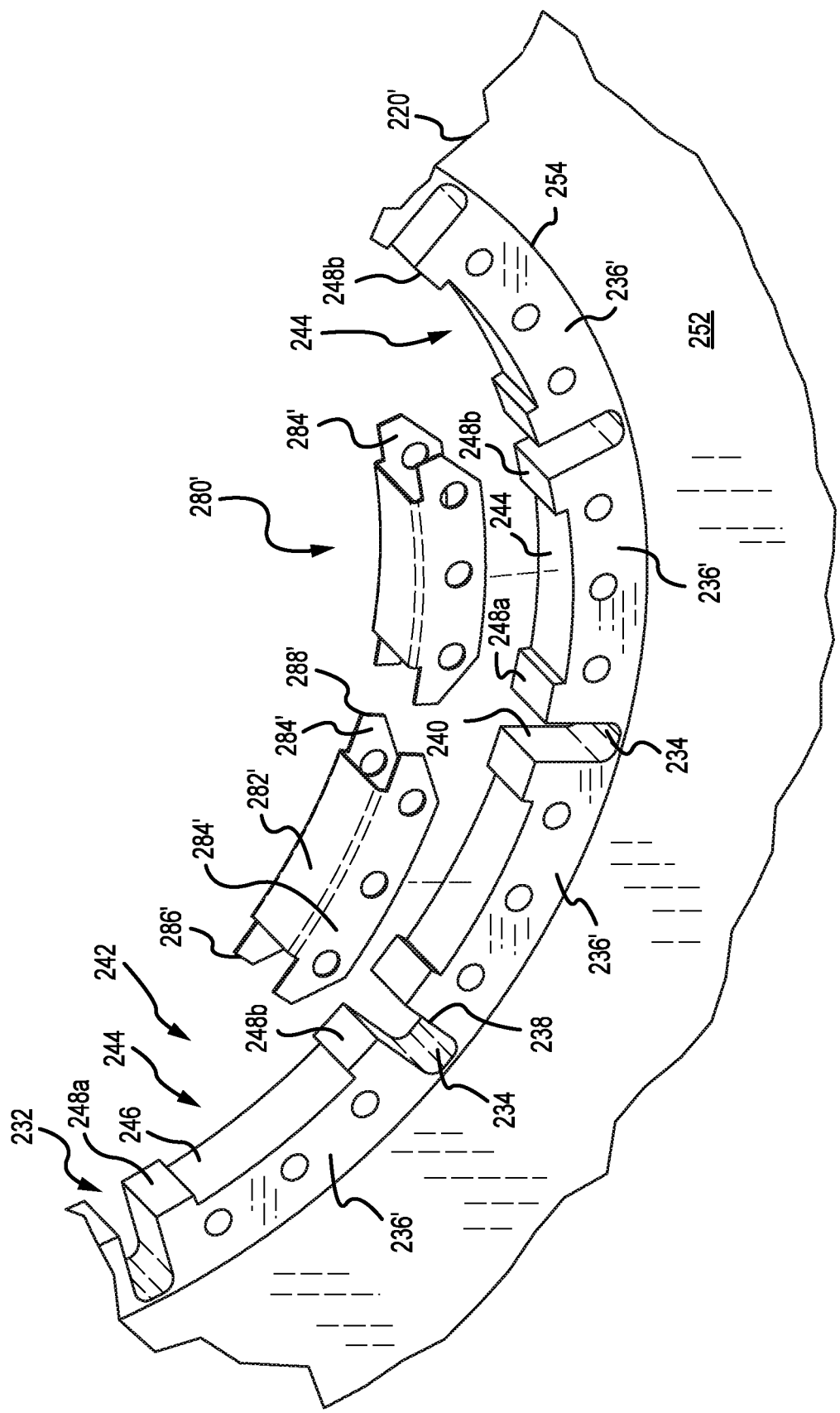
FIG. 4A is a perspective view of a portion of a stator disk assembly that uses a variation of the stator disk of FIG. 2A, where a pair of stator clips are exploded from a corresponding pair of lugs of the stator disk, and where an inner perimeter of each lug includes a notch for receipt of its corresponding stator clip in accordance with various embodiments.
Figure 4B:
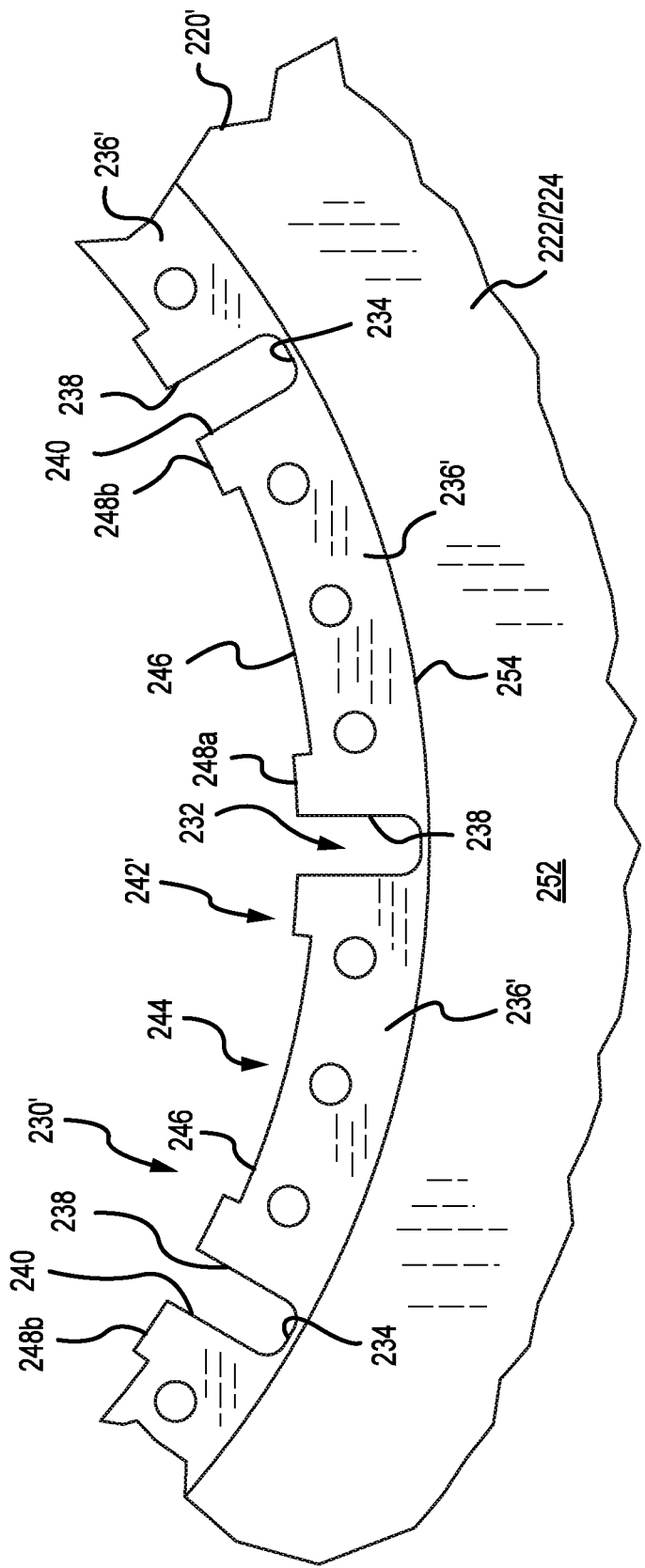
FIG. 4B is a plan view of a portion of the stator disk used by the stator disk assembly of FIG. 4A and that illustrates stator clip notches formed on lugs at the inner perimeter of the stator disk in accordance with various embodiments.
Figure 4C:
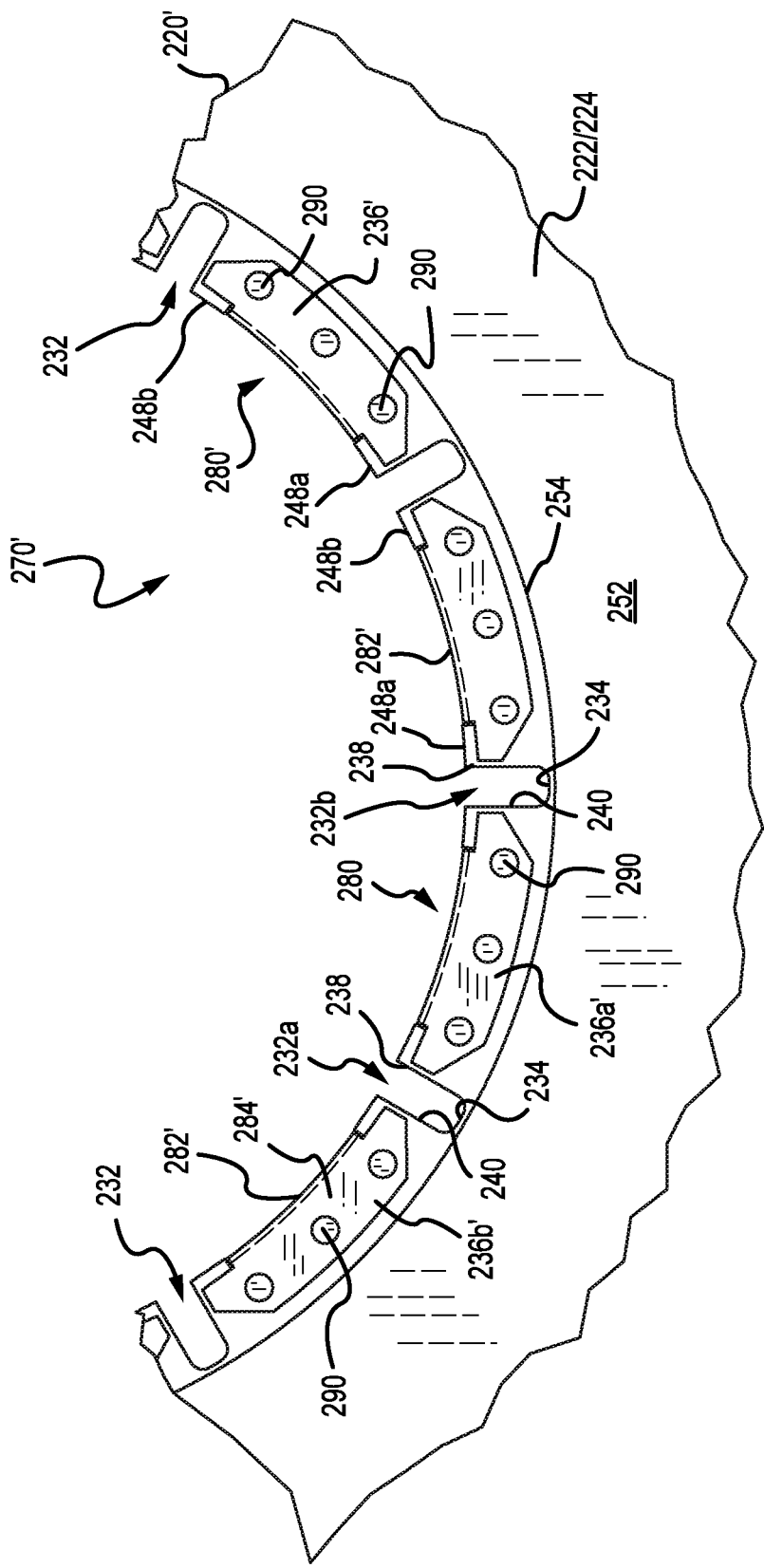
FIG. 4C is a plan view of stator clips that are each mounted in the notch of a different, corresponding lug of the stator disk from the stator disk assembly of FIG. 4A in accordance with various embodiments.
Figure 4D:
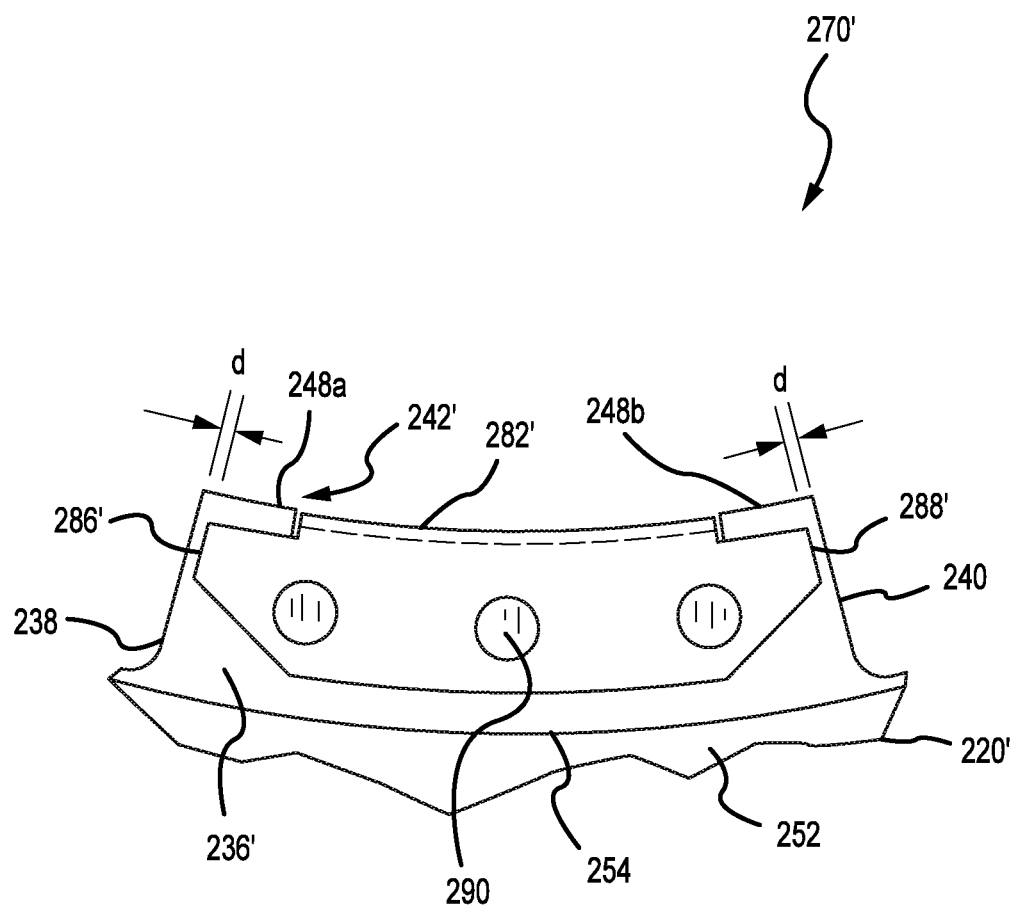
FIG. 4D is an enlarged view of one of the stator clips and the corresponding lug from the stator disk assembly of FIG. 4C in accordance with various embodiments.

Referring primarily to FIG. 4D, the stator clip 280' is positioned on its corresponding lug 236' such that this stator clip 280' does not protrude beyond the first sidewall 238 of the lug 236', and furthermore does not protrude beyond the second sidewall 240 of the lug 236'. In FIG. 4D, the stator clip 280' is more specifically positioned on the lug 236' such that: 1) the first end 286' of this stator clip 280' is spaced from the first sidewall 238 of the lug 236 proceeding about the first reference axis 260 in a direction of the second sidewall 240 of this lug 236' (represented by distance d); and 2) the second end 288' of this stator clip 280' is spaced from the second sidewall 240 of the lug 236' proceeding about the first reference axis 260 in a direction of the first sidewall 238 of this lug 236' (also represented by distance d). Applicable values for the distance d again include without limitation: 1) a distance of at least about 0.020 inches (although other minimum spacings may be appropriate; 2) a distance of no more than about 0.040 inches (although other maximum spacings may be appropriate); and/or 3) a distance within a range of about 0.020 inches to about 0.040 inches. The foregoing is applicable to each lug 236' and its corresponding stator clip 280'.

Each stator clip 280' is disposed in the notch 244 of its corresponding lug 236'. An inner surface of the clip end wall 282' may be disposed in closely-spaced and/or interfacing relation with the notch base 246 of its corresponding lug 236'. The stator clip 280' may be seated within its corresponding notch 244 such that one or more of the following applies: 1) an outer surface of the clip end wall 282' of the stator clip 280' does not protrude beyond the first end wall portion 248a and the second end wall portion 248b of its corresponding lug 236'; 2) an outer surface of the clip end wall 282' of the stator clip 280' may be flush with the first end wall portion 248a and the second end wall portion 248b of its corresponding lug 236' (e.g., such that the outer surface of the clip end wall 282' and its corresponding end wall portions 248a, 248b are disposed a common distance from the first reference axis 260); and/or 3) an outer surface of the clip end wall 282' of the stator clip 280' and its corresponding end wall portions 248a, 248b may be defined by a common radius (e.g., emanating from the first reference axis 260).

There are advantages associated with the integration of the stator clips 280' with the stator disk 220'. One is that the stator clips 280' do not adversely impact or affect the surface area of the braking surface 252 of the stator disk 220'. The surface area of the braking surface 252 on each side of the stator disk 220' should be at least substantially the same as the surface area of the braking surface on each side of the stator disk 220 (FIGS. 3A-3B) when the stator clips 280 are not utilized for the lugs 236. Another is that the stator clips 280' remain sufficiently spaced from the corresponding portion of the outer surface 212 of torque plate 210 (FIG. 2B). That is, the diameter of the inner perimeter 230 of the stator disk 220 (FIG. 3A-3B) may need to be increased when utilizing the stator clips 280 in the above-noted manner, which may reduce the braking surface 252 on each side 222, 224 of the stator disk 220. As such, the design of the stator disk assembly 270' accommodates a retrofit.

Figure 5A:
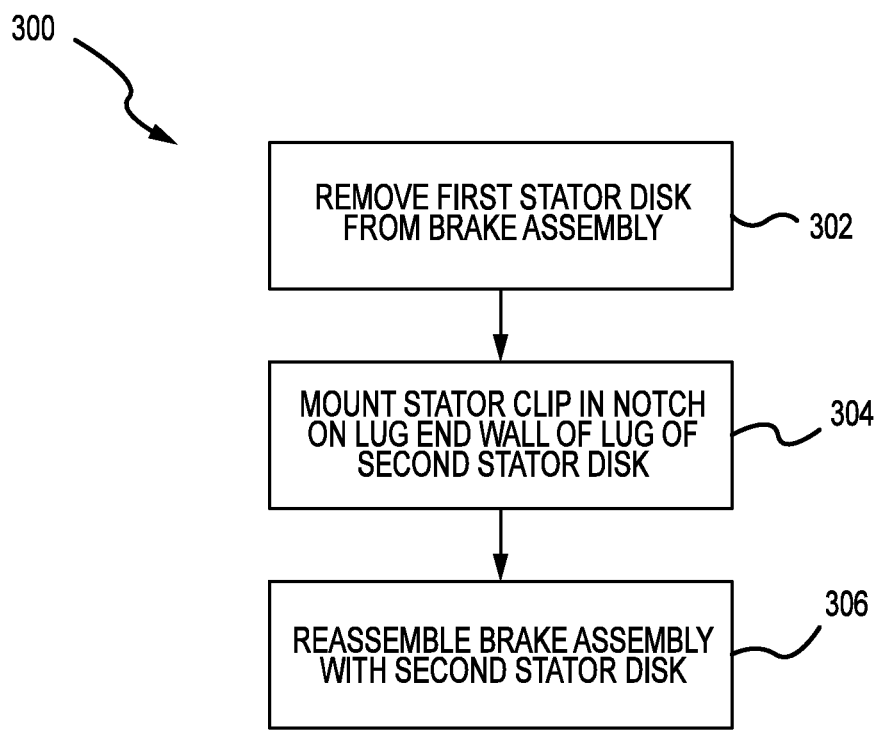
FIGS. 5A and 5B each illustrate a method for reconfiguring a brake assembly in accordance with various embodiments.

A method of reconfiguring a brake assembly is illustrated in FIG. 5A and is identified by reference numeral 300. A first stator disk may be removed from the brake assembly (302). A stator clip is mounted in a notch on a lug end wall of a lug of a second stator disk (304)—the second stator disk may be characterized as a replacement for the first stator disk. A stator clip may be mounted in the notch of the lug end wall of each lug of the second stator disk. In any case, the brake assembly may be reassembled using the second stator disk (306), for instance by disposing the second stator disk between an adjacent pair of rotor disks. The method 300 may of course be used for each stator disk of the brake assembly. It should be appreciated that the method 300 encompasses a retrofit or a refurbishment of the brake assembly with regard to its corresponding stator disks. The method 300 may be in accordance with the above-described stator disk assembly 270'.

Figure 5B:
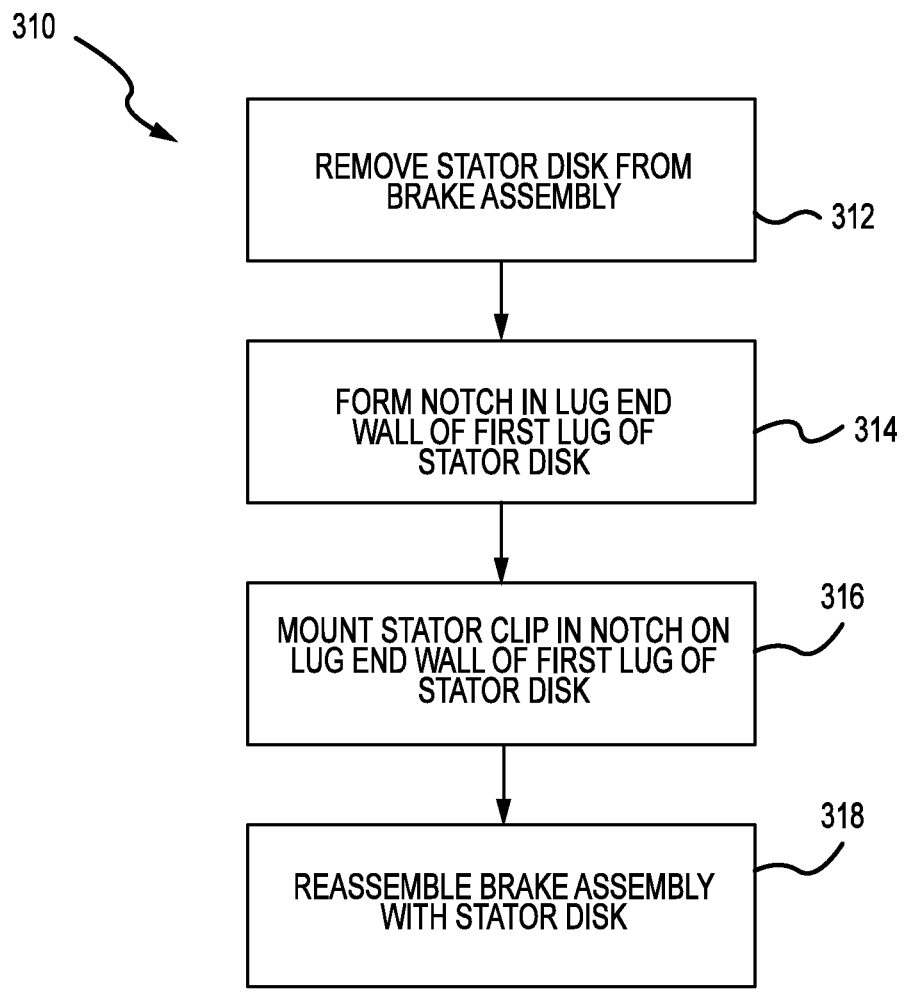

A method of reconfiguring a brake assembly is illustrated in FIG. 5B and is identified by reference numeral 310. A stator disk may be removed from the brake assembly (312). A notch may be formed in a lug end wall of a first lug of the stator disk (314). Such a notch may be formed in the lug end wall of each lug of the stator disk. A stator clip may be mounted in the notch of the lug end wall of the first lug of the stator disk (316). A stator clip may be mounted in the notch of each lug of the stator disk (314, 316). In any case, the brake assembly may be reassembled using the stator disk (318), for instance by disposing the stator disk between an adjacent pair of rotor disks. The method 310 may of course be used for each stator disk of the brake assembly. It should be appreciated that the method 310 encompasses a retrofit or a refurbishment of the brake assembly with regard to its corresponding stator disks. The method 310 may be in accordance with the above-described stator disk assembly 270'.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A stator disk assembly for a brake assembly, comprising:
   a stator disk comprising a plurality of lugs disposed on an inner perimeter of said stator disk, spaced about a first reference axis, said plurality of lugs comprising a first lug, wherein said first lug comprises a lug end wall, a first sidewall and a second sidewall, said first and second sidewalls each extending outwardly from said lug end wall relative to said first reference axis, and wherein said lug end wall comprises a notch; and
   a first stator clip disposed within said notch of said first lug and mounted to said first lug, wherein said lug end wall comprises a first end wall portion and a second end wall portion, wherein said notch extends between said first and second end wall portions, wherein a clip end wall of said first stator clip is flush with said first and second end wall portions of said first lug such that an outer surface of the clip end wall and a corresponding outer surface of said first and second end wall portions are disposed a common distance from said first reference axis, wherein said first stator clip comprises a first clip sidewall and a second clip sidewall, wherein said first clip sidewall is disposed adjacent a first side of the stator disk and extending between the first sidewall and the second sidewall including below the first end wall portion and the second end wall portion, and wherein said second clip sidewall is disposed adjacent a second side of the stator disk and extending between the first sidewall and the second sidewall including below the first end wall portion and the second end wall portion.

2. The stator disk assembly of claim 1, wherein said first stator clip does not protrude beyond said first and second end wall portions in a direction of said first reference axis.

3. The stator disk assembly of claim 1, wherein said first and second end wall portions of said first lug and said clip end wall are defined by a common radius relative to said first reference axis.

4. The stator disk assembly of claim 1, wherein a recess is disposed between each adjacent pair of lugs of said plurality of lugs, wherein said first lug is disposed between a first recess and a second recess, wherein said first sidewall of said first lug interfaces with said first recess and said second sidewall of said first lug interfaces with said second recess, wherein said first stator clip does not protrude beyond said first sidewall of said first lug proceeding about said first reference axis in a direction of said first recess, wherein said first stator clip does not protrude beyond said second sidewall of said first lug proceeding about said first reference axis in a direction of said second recess, and wherein said first and second sidewalls of said first lug are exposed in an installed configuration.

5. The stator disk assembly of claim 4, wherein a first end of said first stator clip is spaced from said first sidewall of said first lug proceeding about said first reference axis in a direction of said second sidewall of said first lug, and wherein an opposite second end of said first stator clip is spaced from said second sidewall of said first lug proceeding about said first reference axis in a direction of said first sidewall of said first lug.

6. The stator disk assembly of claim 5, wherein said first end of said first stator clip is spaced from said first sidewall of said first lug by a distance of at least about 0.020 inches proceeding about said first reference axis in a direction of said second sidewall of said first lug, and wherein said second end of said first stator clip is spaced from said second sidewall of said first lug by a distance of at least about 0.020 inches proceeding about said first reference axis in a direction of said first sidewall of said first lug.

7. The stator disk assembly of claim 4, wherein each lug of said plurality of lugs comprises a first sidewall and second sidewall, the stator disk assembly further comprising:
   a first spline interface for said first recess, wherein said first spline interface consists essentially of said first sidewall of said first lug and said second sidewall of a first adjacent lug of said plurality of lugs, wherein a first base extends between said first lug and said first adjacent lug; and a second spline interface for said second recess, wherein said second spline interface consists essentially of said second sidewall of said first lug and said first sidewall of a second adjacent lug of said plurality of lugs, wherein a second base extends between said first lug and said second adjacent lug, wherein said stator disk comprises said first base and said second base.

8. The stator disk assembly of claim 4, further comprising:
a first crush zone extending from said first sidewall of said first lug to said first stator clip, proceeding about said first reference axis in a direction of said second sidewall of said first lug, and consisting essentially of said stator disk; and
a second crush zone extending from said second sidewall to said first stator clip, proceeding about said first reference axis in a direction of said first sidewall of said first lug, and consisting essentially of said stator disk.

9. A brake assembly comprising:
a torque plate comprising an outer surface disposed about a first reference axis, said outer surface comprising a first spline and a second spline that are spaced from one another proceeding about said first reference axis; and
a stator disk assembly mounted on said torque plate, comprising:
a stator disk comprising an inner perimeter disposed about a first aperture, wherein said inner perimeter comprises a first recess and a second recess that are spaced from one another proceeding about said first reference axis and a first lug disposed between said first recess and said second recess, wherein said first lug comprises a lug end wall that in turn comprises a notch that projects in a direction of said first reference axis; and
a first stator clip disposed within said notch of said first lug and mounted to said first lug, wherein said lug end wall comprises a first end wall portion and a second end wall portion, wherein said notch extends between said first and second end wall portions, wherein a clip end wall of said first stator clip is flush with said first and second end wall portions of said first lug such that an outer surface of the clip end wall and a corresponding outer surface of said first and second end wall portions are disposed a common distance from said first reference axis, wherein said first stator clip comprises a first clip sidewall and a second clip sidewall, wherein said first clip sidewall is disposed adjacent a first side of the stator disk and extending between the first sidewall and the second sidewall including below the first end wall portion and the second end wall portion, and wherein said second clip sidewall is disposed adjacent a second side of the stator disk and extending between the first sidewall and the second sidewall including below the first end wall portion and the second end wall portion;
wherein said first spline is disposed within said first recess and said second spline is disposed within said second recess, and wherein each of said first spline and said second spline are directly engageable with said stator disk within said first recess and said second recess, respectively, without first contacting said first stator clip.

10. The brake assembly of claim 9, wherein said first stator clip does not protrude beyond said first and second end wall portions in a direction of said first reference axis.

11. The brake assembly of claim 9, wherein said first and second end wall portions of said first lug and said clip end wall are defined by a common radius relative to said first reference axis.

12. The brake assembly of claim 9, wherein said first lug comprises a first sidewall and second sidewall that are spaced from one another proceeding about said first reference axis, wherein said first sidewall of said first lug adjoins said first recess, wherein said second sidewall of said first lug adjoins said second recess, wherein said first stator clip does not protrude beyond said first sidewall of said first lug proceeding about said first reference axis in a direction of said first recess, wherein said first stator clip does not protrude beyond said second sidewall of said first lug proceeding about said first reference axis in a direction of said second recess, and wherein said first and second sidewalls of said first lug are exposed in an installed configuration.

13. The brake assembly of claim 12, wherein a first end of said first stator clip is spaced from said first sidewall of said first lug proceeding about said first reference axis in a direction of said second sidewall of said first lug, and wherein an opposite second end of said first stator clip is spaced from said second sidewall of said first lug proceeding about said first reference axis in a direction of said first sidewall of said first lug.

14. The brake assembly of claim 13, wherein said first end of said first stator clip is spaced from said first sidewall of said first lug by a distance of at least about 0.020 inches proceeding about said first reference axis in a direction of said second sidewall of said first lug, and wherein said second end of said first stator clip is spaced from said second sidewall of said first lug by a distance of at least about 0.020 inches proceeding about said first reference axis in a direction of said first sidewall of said first lug.

15. The brake assembly of claim 9, further comprising:
a plurality of lugs disposed on said inner perimeter of said stator disk and comprising said first lug, wherein each lug of said plurality of lugs comprises a first sidewall and second sidewall, and wherein a recess is disposed between each adjacent pair of lugs of said plurality of lugs proceeding about said first reference axis;
a first spline interface for said first recess, wherein said first spline interface consists essentially of said first sidewall of said first lug and said second sidewall of a first adjacent lug of said plurality of lugs, wherein a first base extends between said first lug and said first adjacent lug; and
a second spline interface for said second recess, wherein said second spline interface consists essentially of said second sidewall of said first lug and said first sidewall of a second adjacent lug of said plurality of lugs, wherein a second base extends between said first lug and said second adjacent lug, wherein said stator disk comprises said first base and said second base.

16. The brake assembly of claim 9, further comprising:
a plurality of lugs disposed on said inner perimeter of said stator disk and comprising said first lug, wherein each lug of said plurality of lugs comprises a first sidewall and second sidewall, and wherein a recess is disposed between each adjacent pair of lugs of said plurality of lugs proceeding about said first reference axis;
a first crush zone extending from said first sidewall of said first lug to said first stator clip, proceeding about said first reference axis in a direction of said second sidewall of said first lug, and consisting essentially of said stator disk; and a second crush zone extending from said second sidewall to said first stator clip, proceeding about said first reference axis in a direction of said first sidewall of said first lug, and consisting essentially of said stator disk.

17. A method of reconfiguring a brake assembly comprising a first rotor disk, a second rotor disk, and a first stator disk, wherein said first stator disk is disposed between said first rotor disk and said second rotor disk and comprises a plurality of lugs disposed on an inner perimeter of said first stator disk, spaced about a first reference axis, and comprising a first lug, wherein said first lug comprises a lug end wall and a first sidewall and a second sidewall that each extend outwardly from said lug end wall of said first lug relative to said first reference axis, said method comprising:

removing said first stator disk from said brake assembly, wherein a second stator disk comprises a plurality of lugs disposed on an inner perimeter of said second stator disk, spaced about a second reference axis, and comprising a second lug, wherein said second lug comprises a lug end wall and a first sidewall and a second sidewall that each extend outwardly from said lug end wall of said second lug relative to said first reference axis;

mounting a stator clip in a notch on said lug end wall of said second lug of said second stator disk, wherein said lug end wall comprises a first end wall portion and a second end wall portion, wherein said notch extends between said first and second end wall portions, wherein a clip end wall of said stator clip is flush with said first and second end wall portions of said second lug such that an outer surface of the clip end wall and a corresponding outer surface of said first and second end wall portions are disposed a common distance from said first reference axis, wherein said first stator clip comprises a first clip sidewall and a second clip sidewall, wherein said first clip sidewall is disposed adjacent a first side of the stator disk and extending between the first sidewall and the second sidewall including below the first end wall portion and the second end wall portion, and wherein said second clip sidewall is disposed adjacent a second side of the stator disk and extending between the first sidewall and the second sidewall including below the first end wall portion and the second end wall portion; and reassembling said brake assembly after said mounting, with said second stator disk being disposed between said first rotor disk and said second rotor disk.

18. The method of claim 17, wherein said inner perimeter of each of said first stator disk and said second stator disk are of a common diameter.

\* \* \* \* \*